B. A. BERGER.
BOTTLE HOLDER.
APPLICATION FILED JUNE 7, 1915.

1,184,608.

Patented May 23, 1916.

Witnesses
J. L. Wright
J. J. McCarty

Inventor
B. A. Berger
By Victor J. Evans
Attorney

THE COLUMBIA PLANOGRAPH CO., WASHINGTON, D. C.

UNITED STATES PATENT OFFICE.

BRUNO ALBERT BERGER, OF RICHMOND, VIRGINIA, ASSIGNOR TO BERGER SPECIALTY MANUFACTURING COMPANY, INC., OF RICHMOND, VIRGINIA, A CORPORATION OF VIRGINIA.

BOTTLE-HOLDER.

1,184,608.  Specification of Letters Patent.  Patented May 23, 1916.

Application filed June 7, 1915. Serial No. 32,724.

*To all whom it may concern:*

Be it known that I, BRUNO ALBERT BERGER, a citizen of the United States, residing at the city of Richmond, in the county of Henrico and State of Virginia, have invented new and useful Improvements in Bottle-Holders, of which the following is a specification.

This invention relates to improvements in bottle holders and has particular application to a holder and protecting device for milk bottles.

In carrying out the present invention, it is my purpose to provide a device of the class described whereby the milk bottle will be conveniently and securely held out of contact with the ground or floor so as to prevent animals tampering with the bottle and removing the contents thereof and whereby the mouth of the bottle will be protected from the weather so that the passage of rain water and the like into the bottle will be eliminated.

It is also my purpose to provide a holder of the class described which will embrace the desired features of simplicity, efficiency and durability, which may be manufactured, marketed and installed at a minimum expense and which will readily receive and release the bottle.

With the above and other objects in view, the invention consists in the construction, combination and arrangement of parts hereinafter set forth in and falling within the scope of the claims.

Figure 1:
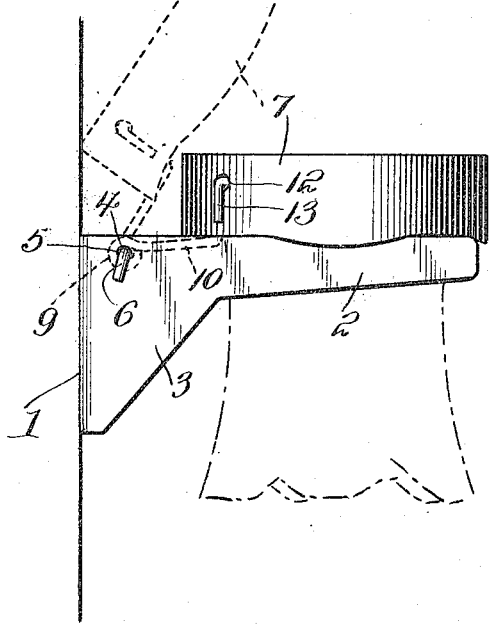
Figure 2:
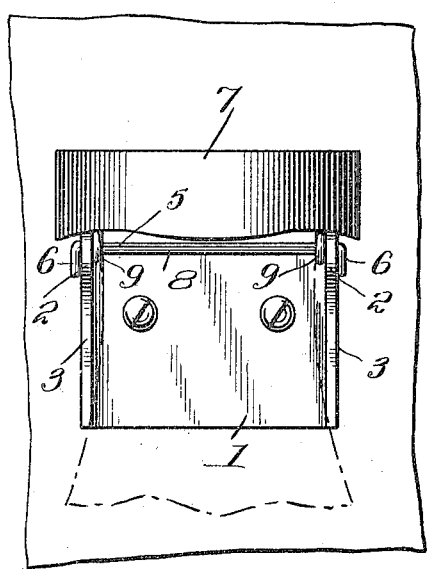
Figure 3:
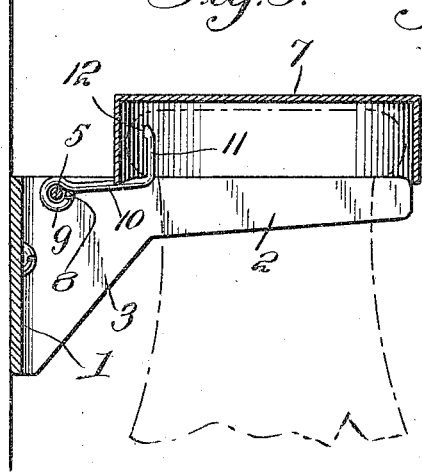
Figure 4:
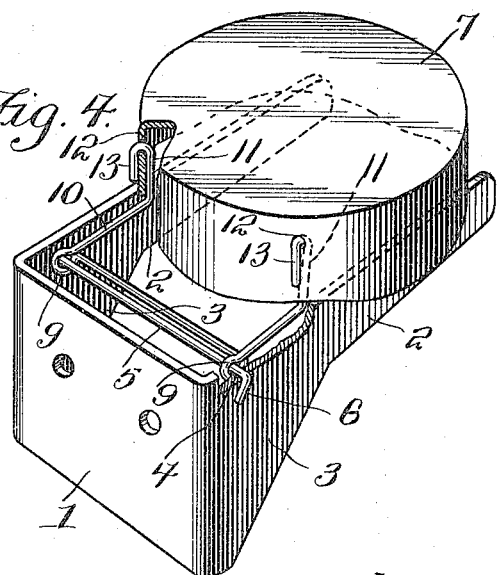

In the accompanying drawing; Figure 1 is a view in side elevation of a milk bottle holder constructed in accordance with the present invention. Fig. 2 is a view in front elevation thereof. Fig. 3 is a cross sectional view therethrough. Fig. 4 is a perspective view of the hinged connection between the cap or cover and the bracket.

Referring now to the drawing in detail, 1 designates a substantially rectangular base formed of metal or other suitable material, while 2 indicates arms formed integral with the base at the opposite extremities thereof and projecting outwardly therefrom and coacting with the base to form a substantially U-shaped bracket. The arms 2 at the juncture with the base are preferably widened as at 3 so as to reinforce the bracket. The arms 2 immediately adjacent to the base 1 are formed with horizontally alining openings 4 and passed through these openings is a pivot pin 5 having the opposite extremities thereof bent at right angles as at 6 to prevent accidental displacement of the pin.

7 designates a cap or cover pivotally mounted upon the pin 5 so that the same may be swung toward and away from the bracket formed by the base 1 and arms 2 and normally resting upon the upper edges of the arms 2 at diametrically opposite points. The hinge or pivotal connection between the cap or cover and the pin 5 comprises a single length of wire 8 bent upon itself at the opposite sides of the central portion thereto to form eyes 9 having the axes thereof parallel with the central portion of the wire and adapted to aline with the openings 4 in the arms 2 to receive the pin 5. The end portions of the wire 8, after the eyes have been formed, are extended at right angles to the central portion of the wire as at 10 and lie parallel with the adjacent portions of the arms 2 and are then bent upwardly at right angles to the portions 10 as at 11 and passed through openings 12 in the flange of the cap or cover 7 and bent upon themselves as at 13 to effectively grip or clamp the flange of the cover. Thus, a rigid connection between the wire 8 and the cap or cover is established and the cap mounted for swinging movement upon the pin 5 and relatively to the bracket.

In practice, securing screws are passed through openings in the base 1 and into a post or other convenient support so that the arms are disposed in a horizontal plane. The neck of the bottle is inserted between the arms and the cap moved upwardly during the placing of the neck of the bottle in the bracket. As the bottle is released the bead at the mouth thereof engages the arms 2 at diametrically opposite points whereby the bottle is suspended by the bracket. The cap is now swung downwardly to completely inclose the mouth of the bottle, thereby preventing longitudinal sliding movement of the bottle along the arms of the bracket and at the same time eliminating the entrance of rain water and other foreign matter to the interior of the bottle.

From the foregoing description taken in connection with the accompanying drawing, the construction and manner of employing my improved bottle holder and protector will be readily apparent.

It will be seen that I have provided a bottle holding device wherein the connections between the arms and the base of the bracket are reinforced and wherein the cap or cover for the bottle may be readily and conveniently swung toward and away from the bracket.

I claim:

A device of the class described comprising a substantially U-shaped bracket adapted to receive the neck of the bottle, a cap designed to inclose the mouth of the bottle and resting upon the upper edges of the arms of the bracket at diametrically opposite points, and a pivotal connection between said cap and bracket, said connection comprising a horizontal pin passed through the arms of the bracket adjacent to the rear ends thereof and a single length of wire bent upon itself at the opposite sides of the central portion thereof to form alining eyes encircling the said pin and thence bent at right angles to such central portion and lying in parallelism with the arms of said bracket and then extended upwardly and fastened to the cap.

In testimony whereof I affix my signature in presence of two witnesses.

BRUNO ALBERT BERGER.

Witnesses:
  M. B. BEALE,
  R. R. FLORANCE.

Copies of this patent may be obtained for five cents each, by addressing the "Commissioner of Patents, Washington, D. C."